(12) United States Patent
Bartoli (10) Patent No.: US 11,567,518 B2
(45) Date of Patent: Jan. 31, 2023

(54) CIRCUIT FOR PROVIDING A FILTERED REFERENCE VOLTAGE AND POWER SUPPLY DEVICE USING SUCH A CIRCUIT

(71) Applicant: AUTOVIB, Miserey-Salines (FR)

(72) Inventor: Frédéric Bartoli, Saint Etienne de Crossey (FR)

(73) Assignee: AUTOVIB

( * ) Notice: Subject to any disclaimer, the term of this patent is extended or adjusted under 35 U.S.C. 154(b) by 14 days.

(21) Appl. No.: 17/381,942

(22) Filed: Jul. 21, 2021

(65) Prior Publication Data

US 2022/0035391 A1 Feb. 3, 2022

(51) Int. Cl.
*G05F 1/46* (2006.01)

(52) U.S. Cl.
CPC .............. *G05F 1/468* (2013.01); *G05F 1/461* (2013.01)

(58) Field of Classification Search
CPC .................................. G05F 1/468; G05F 1/461
See application file for complete search history.

(56) References Cited

U.S. PATENT DOCUMENTS

| | | | |
|---|---|---|---|
| 5,627,736 A * | 5/1997 | Taylor | H02M 1/15 363/39 |
| 7,919,954 B1 * | 4/2011 | Mannama | G05F 1/565 323/272 |
| 8,179,121 B2 | 5/2012 | Hynd et al. | |
| 8,289,009 B1 * | 10/2012 | Strik | G05F 1/575 323/280 |
| 2018/0275701 A1 | 9/2018 | Higuchi | |

FOREIGN PATENT DOCUMENTS

EP 3572818 11/2019

* cited by examiner

*Primary Examiner* — Kyle J Moody
*Assistant Examiner* — Lakaisha Jackson
(74) *Attorney, Agent, or Firm* — Burr & Forman LLP; Harvey S. Kauget

(57) ABSTRACT

The invention relates to a circuit comprising a voltage reference (R) and a low-pass filter (F) electrically connected to the voltage reference (R). The filter (F) comprises a stage formed by a stage resistance (Re) electrically connected at a midpoint (M) to a stage capacitor (Ce), the stage resistance (Re) and the stage capacitor (Ce) at least partially defining a time constant of the filter and the midpoint (M) carrying the filtered reference voltage (V'ref). The circuit also comprises a transistor (T) and a control circuit (Cde) of the gate of the transistor (T) configured to bias the transistor (T) in conduction when the circuit (1) is turned on, the on-state resistance of the transistor (T) combining with the stage capacitor (Ce) to raise the filtered reference voltage (V'ref) with a settling time constant lower than the filter time constant.

17 Claims, 6 Drawing Sheets

CIRCUIT FOR PROVIDING A FILTERED REFERENCE VOLTAGE AND POWER SUPPLY DEVICE USING SUCH A CIRCUIT

FIELD OF THE INVENTION

The present invention relates to a circuit for providing a low frequency and very low frequency reference voltage with low noise. It finds a particular application for forming a power supply for a microelectromechanical integrated circuit, such as a "MEMS" (from the acronym "MicroElectroMechanical Systems") acceleration sensor.

TECHNOLOGICAL BACKGROUND OF THE INVENTION

Documents EP3572818A and U.S. Pat. No. 8,179,121 propose an acceleration sensor having a two-wire interface in IEPE format, the accelerometer of the sensor possibly being a MEMS accelerometer. In these sensors, the supply voltage of the MEMS is drawn from the two-wire interface. For this purpose, to avoid possible variations in the voltage present at this two-wire interface, a voltage reference for example comprising a bandgap component ("bandgap" voltage reference according to the terminology generally used in the field) can be provided for. This voltage reference (which can be integrated into the MEMS circuit or arranged on an electrical routing support on which the MEMS component is also located) provides a stable reference voltage to the MEMS component, independent of the variations that the supply voltage of the sensor undergoes or of the temperature variations.

A MEMS accelerometer has the advantage of providing a static and low frequency measurement of an acceleration (for example less than 1 kHz) with a very favorable signal-to-noise ratio, independent of the frequency. The output signal from a MEMS accelerometer is typically the product of an internal reference voltage (typically the supply voltage) and the raw measurement of the acceleration. This signal is centered on half of its supply voltage (the voltage supplied by the voltage reference when it is present). Consequently, and by design, such a component exhibits low rejection of the supply voltage and half the noise contained in the voltage reference is found in its output signal. Now, a bandgap voltage reference generally exhibits a high noise level, for example 3 microvolts per square root of Hertz for a low consumption voltage reference for its white noise floor. A noise in 1/f is added to this floor, in the low frequency ranges, for example less than 1 kHz, these frequency ranges precisely forming the favored operating range of a MEMS accelerometer.

Of course, provision can be made to provide the voltage reference with a low-pass filter. However, this low-pass filtering can impose an extremely low cutoff frequency. For example, attenuating 30 dB of noise at 0.1 Hz requires developing a filter with a cutoff frequency of 0.003 Hz, and a time constant of approximately 50 seconds. Such a filter exhibits a transient state, when it is started up, leading to a settling time at 99% of the final value of 4 minutes, or even more. During this extremely long transient state, the acceleration sensor which has been fitted with the filter cannot be used with its full precision, which is very disadvantageous.

Document US20180275701 proposes a filter of a supply voltage, the filter being switched to limit the time it takes for the filtered voltage to settle when the device is switched on. However, this filter is in no way suitable for very low frequency filtering of 1/f noise, for example at a cutoff frequency of 1 Hz or less.

OBJECT OF THE INVENTION

It is an object of the invention to address this problem at least in part. It aims more particularly to propose a circuit comprising a low-pass filter to supply a filtered reference voltage, the circuit exhibiting a transient state settling time which is much shorter than that imposed by the time constant of the low-pass filter, which is very long. The circuit is applicable to the low-pass filtering of any voltage reference, and finds a particular application for developing a supply voltage for a MEMS sensor, in particular an accelerometer. The circuit is advantageously very simple, so that it can be integrated into the MEMS component itself or arranged on an electrical routing circuit of small size, for example less than 1 cm^2.

BRIEF DESCRIPTION OF THE INVENTION

With a view to achieving this aim, the object of the invention proposes a circuit for supplying a filtered reference voltage comprising:
- a voltage reference receiving a supply voltage and providing a reference voltage;
- a low-pass filter having a cutoff frequency of less than 1 Hz and electrically connected to the voltage reference and comprising a stage formed by a stage resistance electrically connected at a midpoint to a stage capacitor, the stage resistance and the stage capacitor at least partially defining a time constant of the filter and the midpoint carrying the filtered reference voltage;
- a switching circuit comprising a control electrode, two conduction electrodes, one of which is electrically connected to the midpoint, the switching circuit having an on-state resistance between the two conduction electrodes, the value of which is less than the value of the stage resistance;
- a control circuit connected to the control electrode of the switching circuit and configured to turn the switching circuit on when the circuit is turned on for a predetermined startup period, the on-state resistance of the switching circuit combining with the stage capacitor to raise the filtered reference voltage with a settling time constant less than the filter time constant, the control circuit developing a control signal having a control time constant greater than or equal to the settling time constant.

According to other advantageous and non-limiting features of the invention, taken alone or in any technically feasible combination:
- the stage resistance and the stage capacitor are chosen such that the time constant of the filter is greater than 1 second, and advantageously greater than 100 seconds;
- the switching circuit is a transistor;
- the transistor is an N or P type MOSFET transistor or a JFET transistor;
- the switching circuit is an analog switch or multiplexer;
- the predetermined startup period is less than one minute or less than 30 seconds;
- the on-state resistance of the switching circuit is such that the settling time constant is less than 1 second, preferably less than 100 ms;

the control circuit comprises an RC series circuit defining a control midpoint connected to the gate, the RC series circuit being arranged between a control voltage and a ground of the circuit;

the circuit also comprises a buffer stage receiving the filtered reference voltage as input and supplying a useful voltage;

the buffer stage comprises an operational amplifier mounted as a voltage follower;

the filter comprises at least a second stage formed by a second stage resistance electrically connected to a second stage capacitor, the second stage capacitor also being electrically connected to an output of the circuit;

the circuit also comprises an absorption-compensation circuit of a leakage current of a stage capacitor;

the absorption-compensation circuit comprises an additional capacitor and a discharge switch arranged in parallel with the additional capacitor.

According to another aspect, the object of the invention proposes a device comprising a microelectromechanical integrated circuit and a circuit as described above, this circuit producing a supply voltage for the microelectromechanical integrated circuit.

The circuit of the invention can be integrated into the microelectromechanical integrated circuit or the microelectromechanical integrated circuit and the circuit of the invention can be arranged on an electrical routing support. The microelectromechanical integrated circuit can be an accelerometer.

BRIEF DESCRIPTION OF THE FIGURES

Other features and advantages of the invention will become apparent from the following detailed description of the invention, which is provided with reference to the appended drawings, in which.

DETAILED DESCRIPTION OF THE INVENTION

As an introduction, we recall that the time constant (in seconds) of a dipole formed by a resistance of value r (in ohm) and by a capacitor of value c (in Farad) is the product Tau=r*c. The 95% settling time of a first-order circuit comprising this dipole is 3*Tau, and at 99% of the order of 5 Tau. More generally, and in the context of the present application, it will be considered that the time constant of a circuit corresponds to ⅕ of its settling time at 99%.

Figure 1:
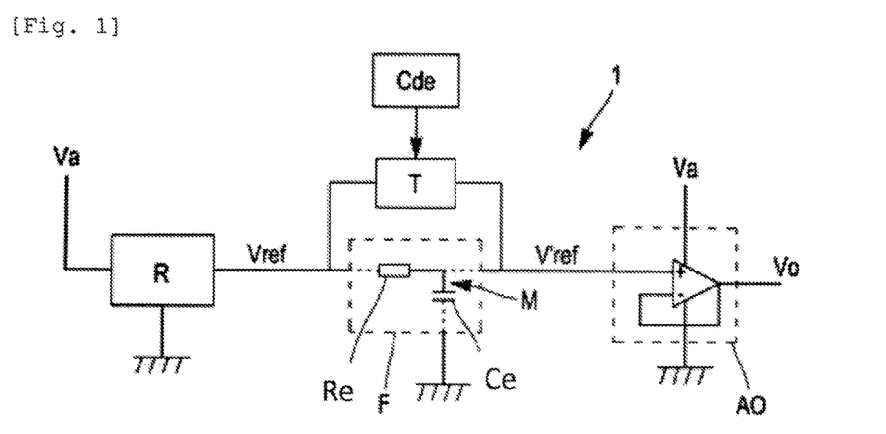
FIG. 1 shows a block diagram of a circuit according to the invention.

FIG. 1 shows a block diagram of a circuit 1 for supplying a filtered reference voltage. The circuit 1 comprises a voltage reference R, for example a bandgap voltage reference as was explained in the introduction to this application. The voltage reference R receives a supply voltage Va from the circuit and supplies a reference voltage Vref, for example between 1.5 V and 5 V, this reference voltage Vref being more stable than the supply voltage.

The circuit 1 also comprises a low-pass filter F which is electrically connected to the voltage reference R. The low-pass filter can have any filter order, and this order can be chosen according to the desired frequency response of this filter F. Advantageously, this order is greater than or equal to two. It has a relatively low cutoff frequency, for example between 10^−3 Hz and 1 kHz. In the field of vibration measurements taken as an example in this description, this cutoff frequency is advantageously less than 0.10 Hz or 1 Hz. As a result, it exhibits a time constant and a very long 99% settling time, for example a settling time of several minutes. In a manner which is well known per se, such a low-pass filter can be formed by a stage or by a plurality of stages, each stage comprising a stage resistance Re which is electrically connected, at a midpoint of stage M, to a stage capacitor Ce. The resistances Re and the capacitors Ce of the stages determine the time constant of the filter and its cutoff frequency. The midpoint M of the stage (or of the last stage, if there are several) carries the filtered reference voltage V'ref and therefore forms the output signal of this filter F. By way of example, and in the context of vibratory measurements, each stage resistance Re can be chosen between 1 Mohms and 100 Mohms, each stage capacitor between 1 microF and 100 microF. In the case of a first-order filter, therefore comprising a single stage, a filter time constant is defined in this way, typically greater than 10 seconds, and therefore a settling time at 99% of nearly one minute.

Figure 9:
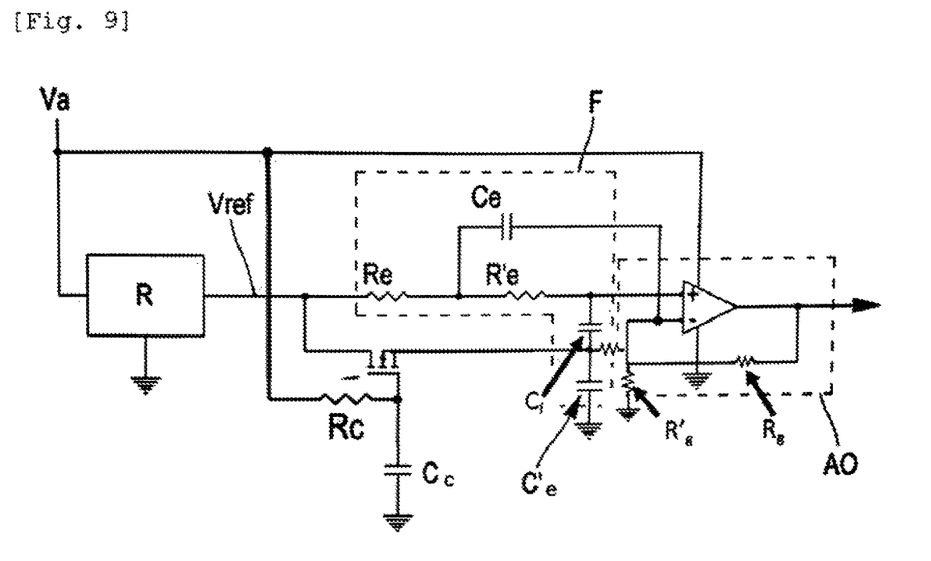

Optionally, the circuit 1 can comprise a buffer stage AO, for example to adjust the impedance of the circuit 1. This buffer stage AO is here formed by an operational amplifier, supplied by the supply voltage Va and mounted as a voltage follower. The electrical output V0, called the useful voltage, of the buffer stage therefore has the same voltage as that present at its differential input, the filtered reference voltage V'ref. Provision could also be made for the buffer stage to have a gain, for example the filtered reference voltage V'ref may have a value of 3 V and the useful voltage may have a value of 5 V. Such an embodiment is shown in FIG. 9, which will be detailed in a later section of this description.

It is noted that the operational amplifier implementing the buffer stage AO, when the latter is present, is chosen to have a noise level, in particular at low frequency, which is significantly lower than the noise threshold imposed by the electronic component application (the MEMS accelerometer in the described example). The introduction, into the circuit 1, of the buffer stage AO behind the filter F therefore does not significantly deteriorate the quality of the supplied electrical signal.

The midpoint M of the last stage of the filter forms the output of the filter. This point carries the filtered reference voltage V'ref which can be supplied to an electronic component to power it. In the preferred application, this electronic component is a vibration measurement sensor, such as an accelerometer which can be implemented by a microelectromechanical integrated circuit (MEMS). When the buffer stage AO is present, the useful voltage V0 supplied by this stage is that supplied to the electronic component to power it.

As already mentioned, the circuit 1 described so far comprises a transient state, when it is started up, the duration of which is excessive for the intended application. This transient state aims to charge the stage capacitors to their nominal voltages. For the values given as an example of the filter in a preceding section of this description, this transient state has a typical duration (of the order of five times the time constant of this filter F) of 50 seconds or more. To continue with this example, an attempt is made to shorten the duration of this transient state very significantly below 50 seconds, for example below a second, or even of the order of a millisecond. To make it possible to obtain a rapid settling time of the circuit, the circuit 1 has been provided with at least one switching circuit T and at least one control circuit Cde of this circuit T. In the described example, the switching circuit T is a transistor, but any other form of circuit could be considered which makes it possible to selectively allow the circulation of electric charges between two so-called "conduction" electrodes using a control signal supplied on a so-called "control" electrode. It may for example be a switch or an analog multiplexer.

The transistor T taken as an example is arranged in parallel with the filter F. When the transistor T is on (conduction biased), its on-state resistance Rds_on is arranged in parallel with the stage resistance Re. The transistor T comprises a gate, a drain electrically connected to the voltage reference R and a source electrically connected to the midpoint M (note that the reverse configuration is also possible: a drain electrically connected to the midpoint, a source electrically connected voltage reference R). The transistor T has an on-state resistance Rds_on, between the drain and the source, the value of which is much lower than the value of the stage resistance Re. Typically, the on-state resistance Rds_on of a transistor (relatively low by nature) will be several decades lower than the stage resistance Re (chosen to be high and to contribute to the low cutoff frequency of the filter F). The on-state resistance Rds_on of the transistor T is typically less than or equal to 1 ohm, of the order of 100 milliohms or a few hundred milliohms.

The circuit 1 also comprises a control circuit Cde for the gate of the transistor T. This circuit Cde is configured to bias the transistor T in conduction when the circuit 1 is started up during a predetermined startup period. The term "switching on of the circuit" denotes the instant TO at which the supply voltage Va is applied to the circuit 1, and in particular to the voltage reference R. In the "on" configuration, the on-state resistance Rds_on of the transistor T clears the stage resistance Re with which it is placed in parallel and combines with the stage capacitor Ce to raise the voltage of the stage midpoint M carrying the filtered reference voltage V'ref with a settling time constant much lower than the time constant of the filter F. By neglecting the presence of the stage resistance Re, the time constant of the on configuration of the circuit 1 corresponds to the product Rds_on*Ce, of the order of 100 microseconds, taking the values in the example. The predetermined startup period during which the transistor T (or more generally the switching circuit) is controlled to be on can be chosen very freely, greater than the time constant of the on configuration of the circuit 1. It can for example be chosen on the order of a second or 10 seconds, or more. It is possible in particular to choose that it has a duration greater than 30 seconds, in order to guarantee the correct charging of all the capacitors of the circuit. It is noted that during the startup period during which the control circuit Cde controls the switching circuit T so that it is on, the application electronic component is indeed supplied with power and functional, even if it does not have a filtered supply voltage.

The control circuit Cde can take any suitable form; it can in particular be an analog or digital circuit implementing a timer function for the predetermined startup period. The control circuit can also implement functions other than that aimed at controlling the switching circuit. This may for example be a function aimed at reinitializing at least some of the capacitors present in the circuit 1, for example by actuating switches arranged between the terminals of these capacitors, in order to accelerate the stabilization of the low-pass filter when starting or restarting the circuit 1.

Advantageously, however, to keep the compact nature of the circuit 1 and all its simplicity when it is implemented by discrete components, and as will be presented in the examples which follow, the control circuit Cde comprises an RC dipole or series circuit, comprising a control resistance Rc and a control capacitor Cc, defining a control midpoint Mc connected to the gate of the transistor T. The control circuit Cde is placed between a control voltage (for example the supply voltage Va, the reference voltage Vref, the filtered reference voltage V'ref or the useful voltage V0) and the ground of the circuit 1. The values of the resistance Rc and of the capacitor Cc of the control circuit Cde are chosen to define a settling time of the control signal applied to the gate of the transistor T greater than the settling time aimed at rapidly charging the stage capacitor Ce, and therefore conforms to the predetermined startup period.

In this way, it is very simply ensured that the transistor T is placed in a conduction state for a sufficiently long period to allow the stage capacitor Ce of the filter to be fully charged. It is for example possible to choose the control resistance Rc and the control capacitor Cc so that they have values ten times lower than the values of the stage resistance Re and the stage capacitor Cc. The time constant of the control circuit is then 100 times less than the time constant of the filter F, but remains greater than the time constant of the circuit 1 when the transistor T is on.

Figure 2:
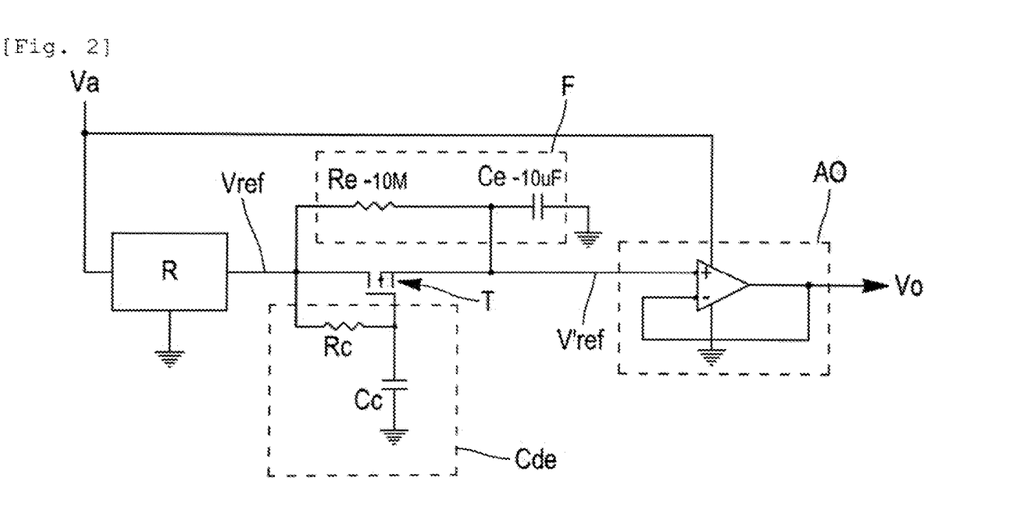
FIG. 2 shows an implementation of a circuit according to the invention.

With reference to FIG. 2, an example of the implementation of the principles which have just been explained is now presented. This example shows the voltage reference R supplied by the supply voltage Va, the optional buffer stage AO, the low-frequency filter F, here formed by a single stage comprising a stage resistance Re and a stage capacitor Ce. The time constant of the filter F here is 100 seconds, leading to a settling time of this filter (in the absence of the means provided by the invention) of the order of 500 s. The transistor T here is a P-type MOSFET transistor whose on-state resistance Rds_on is estimated at 1 ohm (more generally 1 to 10 ohms). In the on state, this resistance Rds_on is in parallel with the stage resistance Re, and the settling time constant of this circuit 1 is of the order of 100 microseconds.

The control circuit Cde of this example is formed by an RC series circuit, the resistance Rc being connected to the output of the voltage reference R (brought to the reference voltage Vref) and the gate of the transistor T. The control capacitor Cc is in turn disposed between the gate of the transistor T and the ground of the circuit 1. With the chosen values of the resistance Rc and of the capacitor Cc of the control circuit Cde, the transistor T is kept on for a period Tau c of the order of 100 ms (defining the startup period), which is much greater than the few 100 microseconds or the few milliseconds necessary to charge the stage capacitor Ce and to finalize the transient settling period of the circuit 1 at its startup. The implementation of the control circuit by means of a reduced number of simple components, here a simple combination of a control resistance Rc and a control capacitor Cc, makes it possible to preserve the simplicity and compactness of this circuit Cde and of a circuit 1 according to the invention.

Figure 3:
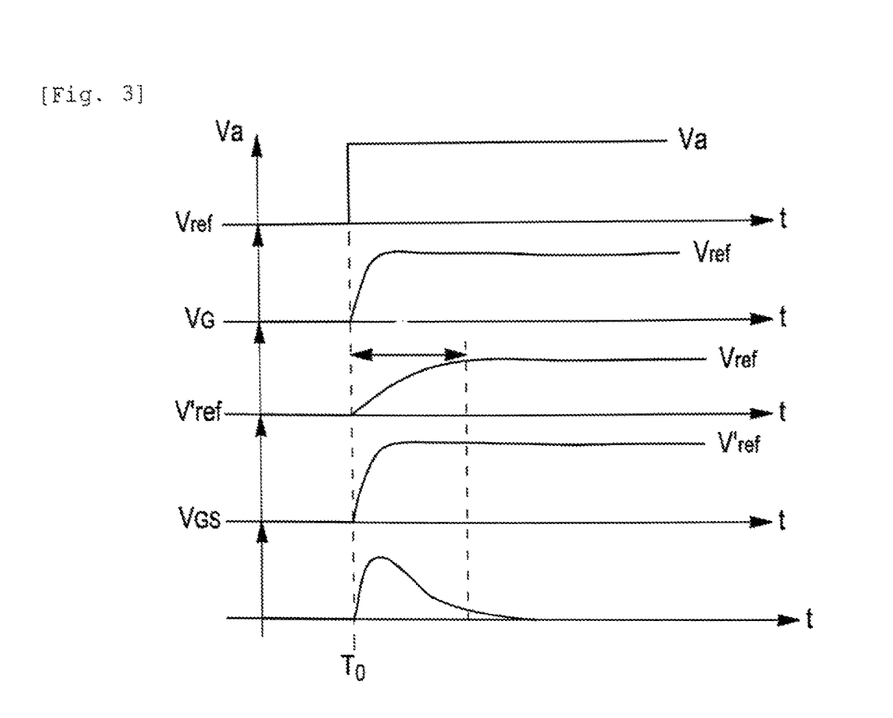
FIG. 3 shows a timing diagram explaining the operation of the circuit of FIG. 2.

FIG. 3 shows the evolution of the voltages in the circuit 1 of FIG. 2 since the instant TO of its startup. During this startup phase (voltage rise of the filtered reference V'ref), the PMOS is conduction biased by the control circuit Cde, the time constant of which is large compared to the rise time of the filtered reference voltage V'ref. During this rise, the time constant of the circuit 1 is the product Ce*Rds_on; the charge of the stage capacitor Ce (V'ref also corresponding to the voltage carried by the source of the transistor T) is therefore almost instantaneous.

Once the filtered reference voltage V'ref has stabilized, the gate potential joins that of the drain, which itself is at the potential of the source of the transistor T. We thus arrive at VGS=0 and the transistor T is blocked. It is noted that the intrinsic diode of the transistor T (i.e. between the drain and the source) ensures that this transistor can be put into conduction by forcing the source potential to rise (0.5-0.6 V max under the drain voltage) at startup. The dynamic resistance at zero voltage of the intrinsic diode of the transistor T has a negligible impact on the time constant of the filter in normal operation.

Figure 4:
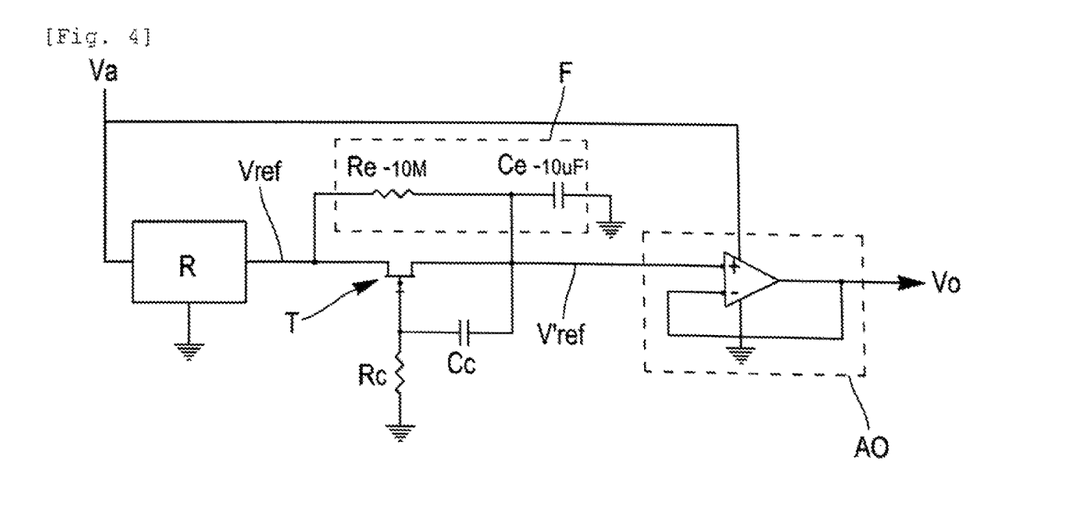
FIGS. 4, 5a, 5b, 5c, 6 to 9 show other examples of implementation of a circuit according to the invention.

Many variations of this example are possible. In general, the switching circuit T can be implemented by any form of transistor (JFET, BJT, MOSFET, etc.) and any type (N or P) because, by definition, it is blocked during normal operation of the circuit 1, i.e. outside the startup period. The control circuit Cde will be adjusted to produce the control signal which is suitable for the selected transistor. For example, the MOSFET transistor of FIG. 2 can be replaced by a JFET transistor. Such a transistor being on at the gate-source voltage Vgs=0, the filter F is naturally charged when the circuit is started up, then the gate-source voltage dropping below the threshold voltage of the transistor, the latter opens. Such an embodiment is shown in FIG. 4.

The resistance Rc of the control circuit is electrically connected to the reference voltage Vref in the example of FIG. 2. However, it could naturally be considered to connect this resistance to other voltages of the circuit, all to define a control signal on the gate of the transistor T having a time constant greater than the time constant of the circuit 1 during the rapid charging of the stage capacitor Cc during the transient state.

Figure 5A:
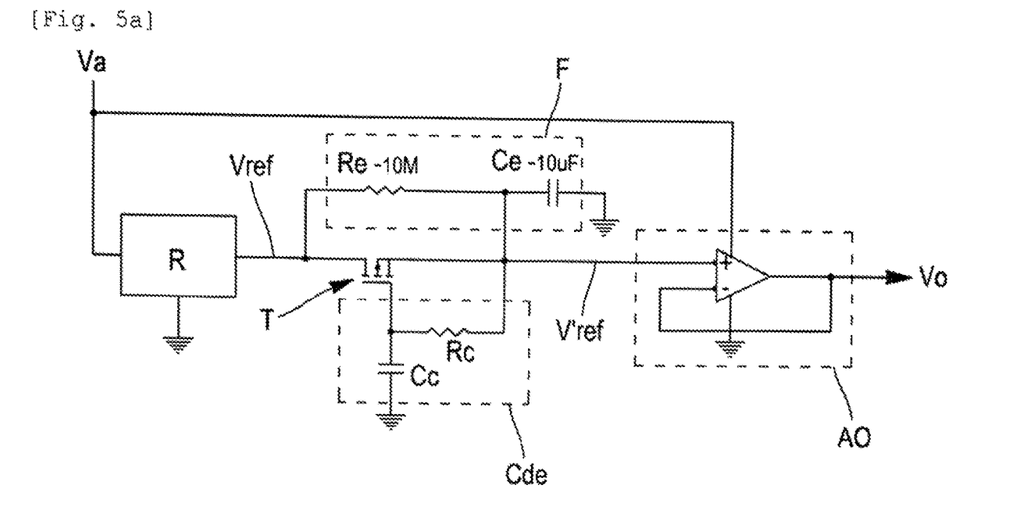
Figure 5B:
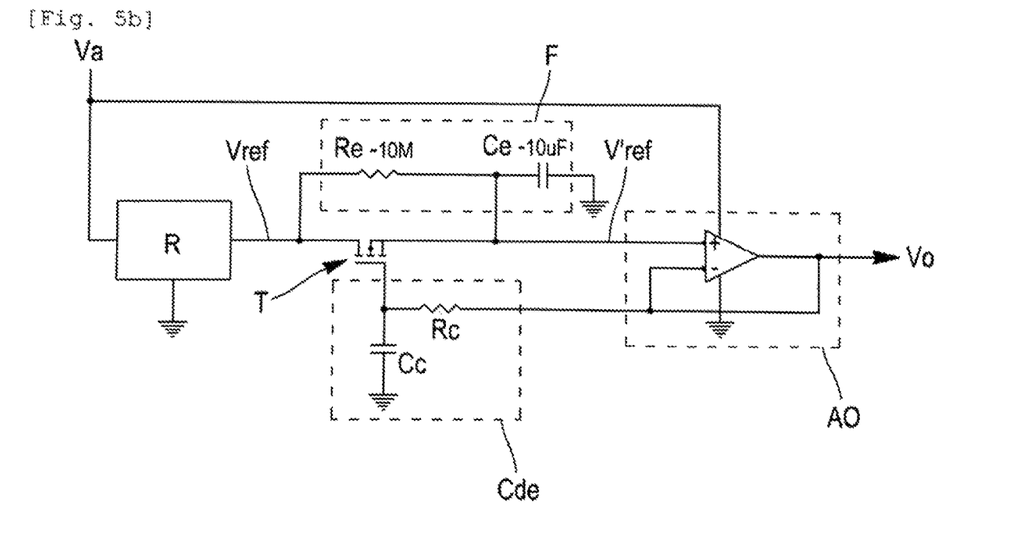
Figure 5C:
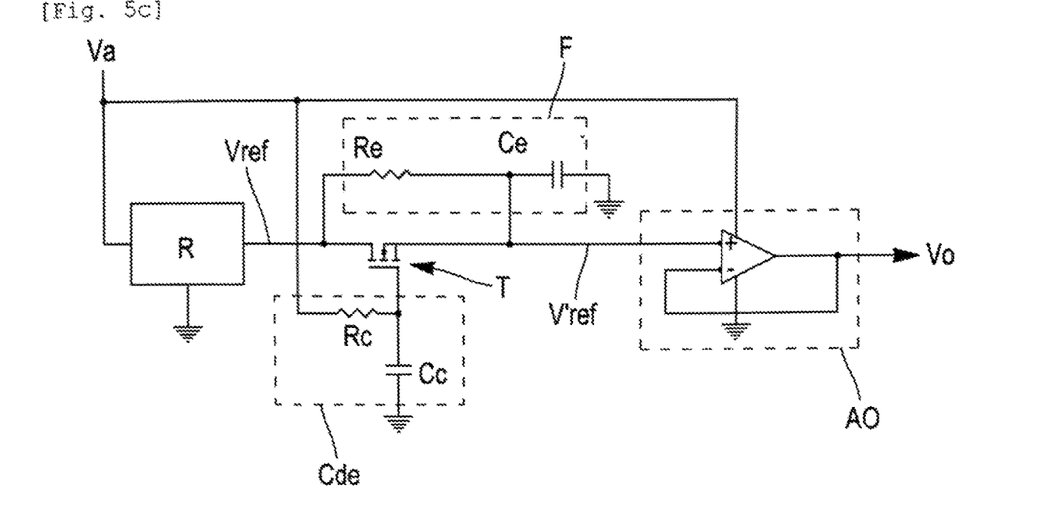

Thus, in FIGS. 5a to 5c, examples are shown where this resistance Rc is connected to the midpoint M of the filter F (filtered reference voltage V'ref—FIG. 5a), to the useful voltage V0 issuing from the buffer stage AO (FIG. 5b), at the supply voltage Va (FIG. 5c). The filter F can also be composed of a plurality of stages and according to one possible diagram, each stage can be provided with a transistor T and a control circuit Cde to charge the stage resistance Ce in a reduced time. Alternatively, the same control circuit can control the gates of the plurality of transistors T.

Figure 6:
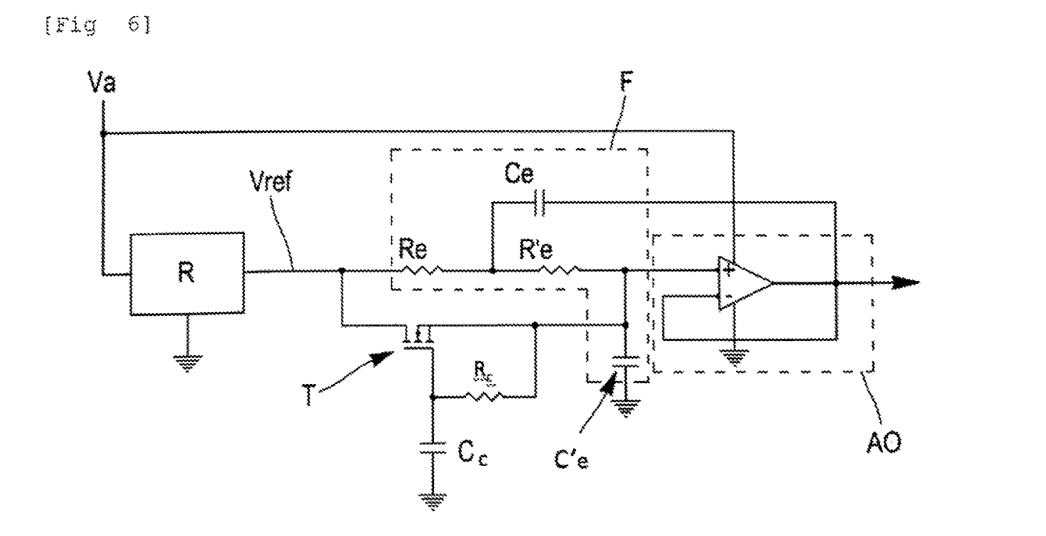

FIG. 6 shows an advantageous configuration of a circuit 1 comprising a filter with several stages, and therefore of order greater than 1, here a Sallen-Key type structure. A single transistor T is arranged in parallel with the filter F, and therefore with all of the resistances Re, R'e of the stages. The drain of the transistor T is connected to the reference voltage Vref supplied by the voltage reference R, and the source of this transistor is connected to the midpoint M of the last stage of the filter F. As already noted, a reverse configuration is also possible. The stage capacitor C'e of this last stage is connected between the midpoint of this last stage and the ground of circuit 1.

Note that a filter of order strictly greater than 1 has the advantage of bringing the filter back to equilibrium, when it deviates therefrom, in a shorter duration than a filter of order 1. This deviation from equilibrium can be caused by the temperature gradients that the device is likely to experience in its operating environment.

The capacitors Ce of the intermediate stages are for their part connected, directly or indirectly, to the reference voltage V'ref or to the useful voltage V0 supplied by the buffer stage AO (as is the case in FIG. 6). In steady state, the midpoints of each stage are therefore substantially brought to the filtered reference voltage V'ref (or to the useful voltage V0). The transient state therefore aims to raise the voltage of all these midpoints by charging all the stage capacitors very quickly.

When the transistor T is in the on state, when the circuit 1 starts up, it short-circuits the filter F and very quickly charges the capacitor C'e of the last stage of this filter F. This makes it possible to simultaneously raise the voltage of all the other midpoints of this filter by charging all the other stage capacitors Ce. Such a configuration is advantageous in that it makes it possible, with a very simple circuit (a single transistor/switching circuit and an RC dipole/control device), to place the circuit 1 in steady state with an extremely short transition, even when the order of the filter F is high.

Figure 7:
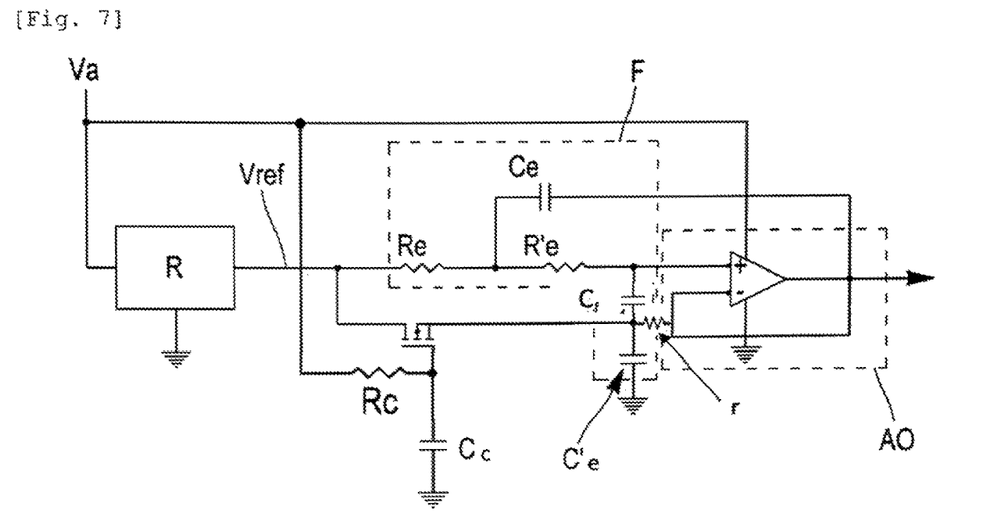

FIG. 7 shows a variant of the circuit of FIG. 6 comprising a filter with several stages. This variant provides for an absorption-compensation circuit Cf, r which aims to compensate for the possible leakage current of the capacitor C'e of the last stage, arranged between the midpoint of this last stage and the ground of the circuit. If such a leakage current is excessive, it could lead to an excessive deviation of the filtered reference voltage V'ref (and therefore of the useful voltage V0) from the reference voltage Vref.

In this circuit of FIG. 7, an additional capacitor Cf has been placed between the resistance R'e of the last stage of the filter and the stage capacitor C'e, and in series with this capacitor C'e. The additional capacitor Cf has a value much greater than the stage capacitor (for example 5 or 10 times greater), so that the value of the equivalent capacity of this series branch is very similar to the capacitor C'e of this last stage. In other words, the voltages on either side of the additional capacitor Cf are very close to each other, or even identical, and therefore correspond to the filtered reference voltage V'ref. In this configuration, it will be considered that the midpoint of this last stage of the filter F is placed between the additional capacitor Cf and the stage capacitor C'e. It should also be noted that the electrode of the switching circuit T is indeed connected to this midpoint, which makes it possible to directly raise the voltage present across the terminals of the stage capacitor C'e when this circuit is controlled to be on, in accordance with the principles of the present invention which have already been explained. Finally, a leakage resistance r has been provided between the midpoint of this last stage and one of the inputs of the buffer stage AO (the one electrically connected to the useful voltage V0 in FIG. 7). In this configuration, the buffer stage AO supplies the leakage current which can flow through the capacitor C'e of this last stage, connected to the ground of the circuit. The appearance of a difference between the reference voltage Vref and the filtered reference voltage V'ref is thus avoided or limited.

The absorption-compensation circuit which has just been presented in the context of a two-stage filter F could quite naturally be incorporated into a filter having any number of stages, in order to absorb-compensate for the leakage current of the capacitor disposed between the filtered reference voltage V'ref and the ground of the circuit.

For the sake of completeness, it is noted that in FIG. 7 the control resistance Rc is connected to the supply voltage Va, and not to the reference voltage as was the case in FIG. 6. As already mentioned, the voltage to which the control resistance is connected is not critical as long as this voltage is high enough, and a circuit can comprise a control resistance Rc connected to any voltage source or to any node of the circuit supplying sufficient voltage to open the switching circuit T.

With the aim of accelerating the stabilization of the filter upon starting or restarting of the circuit 1, it is also possible to incorporate means in the absorption-compensation circuit allowing the additional capacitor Cf to be discharged when switching off or starting/restarting the circuit 1. It may in particular be a discharge switch arranged between the terminals of the additional capacitor Cf, in parallel with this capacitor, making it possible to short-circuit this capacitor or making it possible to connect these electrodes to the same voltage of the circuit. As has already been noted, these switches can be driven by the control circuit, in particular when the latter is implemented by a digital circuit.

Figure 8:
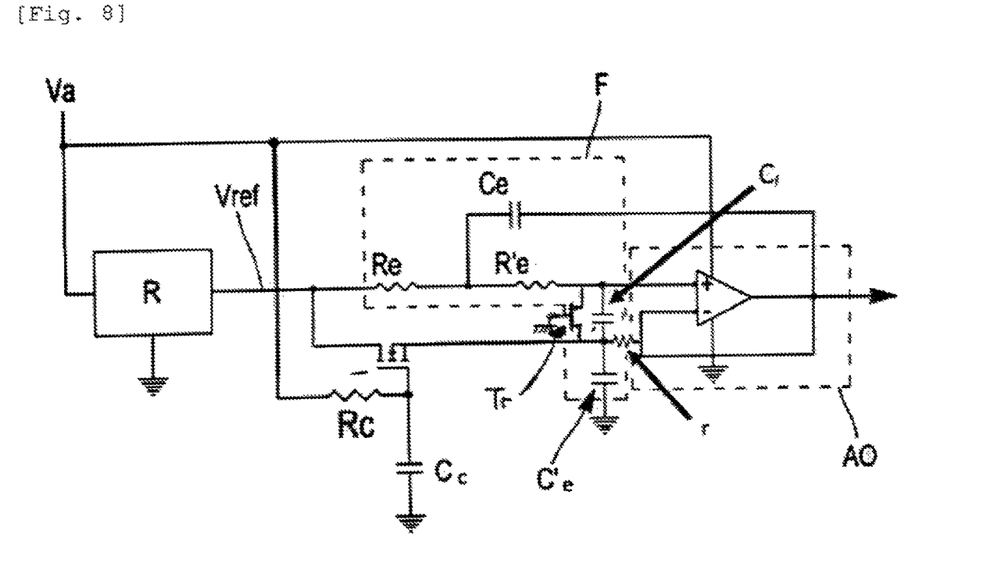

Alternatively, and as shown in FIG. 8, the switch can be autonomous. In this figure, the switch is implemented by a JFET transistor arranged in parallel with the additional capacitor Cf, the source and the drain being electrically connected across the terminals of this capacitor. The gate of the transistor is connected to the ground. In operation, the voltage between the source and the gate is greater than the threshold voltage of the transistor, which turns it off. When circuit 1 is switched off, the stage capacitor C'e tends to discharge, so that the midpoint voltage between this capacitor and the additional capacitor Cf also tends to carry a ground voltage. The voltage between the source and the gate of the transistor goes below the threshold voltage, which turns the transistor on and leads to balancing the voltages present across the terminals of the additional capacitor Cf.

In addition to the additional capacitor Cf, provision may be made to provide other capacitors of the circuit 1 with these discharge means, or even to equip all the capacitors of this circuit 1. The switches used can either be driven by the control circuit Cde or be autonomous.

Of course, the invention is not limited to the examples described and it is possible to add variants without departing from the scope of the invention as defined by the claims.

In particular, provision can be made to use the useful voltage V0 supplied at the output of the buffer stage AO and to inject it retroactively at the input of the voltage reference R, for example by replacing the supply voltage Va. Thus, only the AO is supplied by Va, and the reference circuit R is supplied from V0. In this case in particular, it may be useful to provide an additional startup assistance circuit in the circuit 1 which has just been described.

Still other elements can be included in a circuit 1 according to the invention. For example, it is possible to provide elements ensuring a controlled restart during a rapid cycle of a power-off-power-on sequence of the circuit 1. This may for example be a parallel resistance on the output of the voltage reference R, the purpose of which is to guarantee a reset of the time constant of the control circuit Cde, regardless of the nature of the voltage reference R.

Finally, and in order to avoid any drift in the operation of the circuit with variations in temperature, it is possible to choose the components (in particular the resistances and capacitors of the circuit) so that their values are particularly insensitive to temperature. Alternatively, it is possible to provide means compensating for any temperature drifts of these values.

FIG. 9 shows an embodiment in which the buffer stage AO has a gain, determined by the ratio existing between a first gain resistance Rg and a second gain resistance R'g, as is well known in itself.

In this embodiment, and to avoid the appearance of a transient state of the filter F, it is preferable to connect one of the terminals of the stage resistance Ce to an input of the buffer stage AO, rather than to an output of this stage.

The invention is of particular interest in forming a power supply for a microelectromechanical integrated circuit. According to a first approach, the circuit 1 is integrated into the integrated circuit itself; the capacitor Ce, typically of high value, can be external to the integrated circuit. In this case, the integrated circuit is powered by the supply voltage Va, which is transferred to a pin of this integrated circuit to which the circuit 1 according to the invention is connected. This integrated circuit 1 supplies the filtered reference voltage V'ref (or the useful voltage V0) to the rest of the microelectromechanical integrated circuit. In this "integrated" approach, the control circuit Cde can take a more complex form, for example a digital form, than the RC dipole proposed as an example.

According to a second approach, the microelectromechanical integrated circuit and the circuit 1 according to the invention are arranged on an electrical routing support. In this case, the filtered reference voltage V'ref (or the useful voltage V0) is transferred to a supply pin of the microelectromechanical integrated circuit. Since the circuit 1 of the invention is particularly simple, this routing support can be of very small size, less than 1 cm^2 for example. In this approach, it may be advantageous to form the control circuit Cde from discrete components.

As presented in the introduction, a circuit in accordance with the invention finds a very particular application when the microelectromechanical integrated circuit is an accelerometer. However, the circuit of the invention can be used to power any type of integrated circuit, and more generally still, to supply a reference voltage filtered of its noise at a cutoff frequency which can be very low.

What is claimed is:

1. A Circuit for supplying a filtered reference voltage comprising:
    a voltage reference receiving a supply voltage and providing a reference voltage;
    a low-pass filter having a cutoff frequency of less than 1 Hz and electrically connected to the voltage reference and comprising a stage formed by a stage resistance electrically connected at a midpoint to a stage capacitor, the stage resistance and the stage capacitor at least partially defining a time constant of the filter and the midpoint carrying the filtered reference voltage;
    a switching circuit comprising a control electrode, two conduction electrodes, one of which is electrically connected to the midpoint, the switching circuit having an on-state resistance between the two conduction electrodes, the value of which is less than the value of the stage resistance; and
    a control circuit connected to the control electrode of the switching circuit and configured to turn the switching circuit on when the circuit is turned on for a predetermined startup period, the on-state resistance of the switching circuit combining with the stage capacitor to raise the filtered reference voltage with a settling time constant less than the filter time constant, the control circuit developing a control signal having a control time constant greater than or equal to the settling time constant.

2. The circuit according to claim 1, wherein the stage resistance and the stage capacitor are chosen such that the time constant of the filter is greater than 1 second, and advantageously greater than 100 seconds.

3. The circuit according to claim 1, wherein the switching circuit is a transistor.

4. The circuit according to claim 3, wherein the transistor is an N or P type MOSFET transistor or a JFET transistor.

5. The circuit according to claim 1, wherein the switching circuit is an analog switch or multiplexer.

6. The circuit according to claim 1, wherein the predetermined startup period is less than 30 seconds or one minute.

7. The circuit according to claim 1, wherein the on-state resistance of the switching circuit is such that the settling time constant is less than 1 second, preferably less than 100 ms.

8. The circuit according to claim 1, wherein the control circuit comprises an RC series circuit defining a control midpoint connected to the control electrode of the switching circuit, the RC series circuit being arranged between a control voltage and the ground of the circuit.

9. The circuit according to claim 1, further comprising a buffer stage receiving the filtered reference voltage as input and supplying a useful voltage.

10. The circuit according to claim 9, wherein the buffer stage further comprises an operational amplifier mounted as a voltage follower.

11. The circuit according to claim 1, wherein the filter further comprises at least a second stage formed by a second stage resistance electrically connected to a second stage capacitor, the second stage capacitor being electrically connected to an output of the circuit.

12. The circuit according to claim 1, further comprising an absorption-compensation circuit of a leakage current of a stage capacitor.

13. The circuit according to claim 12, wherein the absorption-compensation circuit further comprises an additional capacitor and a discharge switch arranged in parallel with the additional capacitor.

14. A device comprising a microelectromechanical integrated circuit and a circuit according to claim 1, the circuit producing a supply voltage for the microelectromechanical integrated circuit.

15. The device according to claim 14, wherein the circuit is integrated into the microelectromechanical integrated circuit.

16. The device according to claim 14 further comprising an electrical routing support, the microelectromechanical integrated circuit and the circuit being arranged on the electrical routing support, the circuit further comprising an absorption-compensation circuit of a leakage current of a stage capacitor.

17. The device according to claim 16, wherein the microelectromechanical integrated circuit is an accelerometer.

* * * * *

UNITED STATES PATENT AND TRADEMARK OFFICE
CERTIFICATE OF CORRECTION

| | | |
|---|---|---|
| PATENT NO. | : 11,567,518 B2 | |
| APPLICATION NO. | : 17/381942 | |
| DATED | : January 31, 2023 | |
| INVENTOR(S) | : Frédéric Bartoli | |

It is certified that error appears in the above-identified patent and that said Letters Patent is hereby corrected as shown below:

On the Title Page

Item (30), insert the following:
--Foreign Application Priority Data
Jul 30, 2020 ( FR ) 2008130--

Signed and Sealed this
Fifth Day of December, 2023

Katherine Kelly Vidal
*Director of the United States Patent and Trademark Office*